J. T. TUCKER.
SAFETY STOCK DEVICE.
APPLICATION FILED APR. 25, 1919.
1,375,189.
Patented Apr. 19, 1921.
2 SHEETS—SHEET 2.
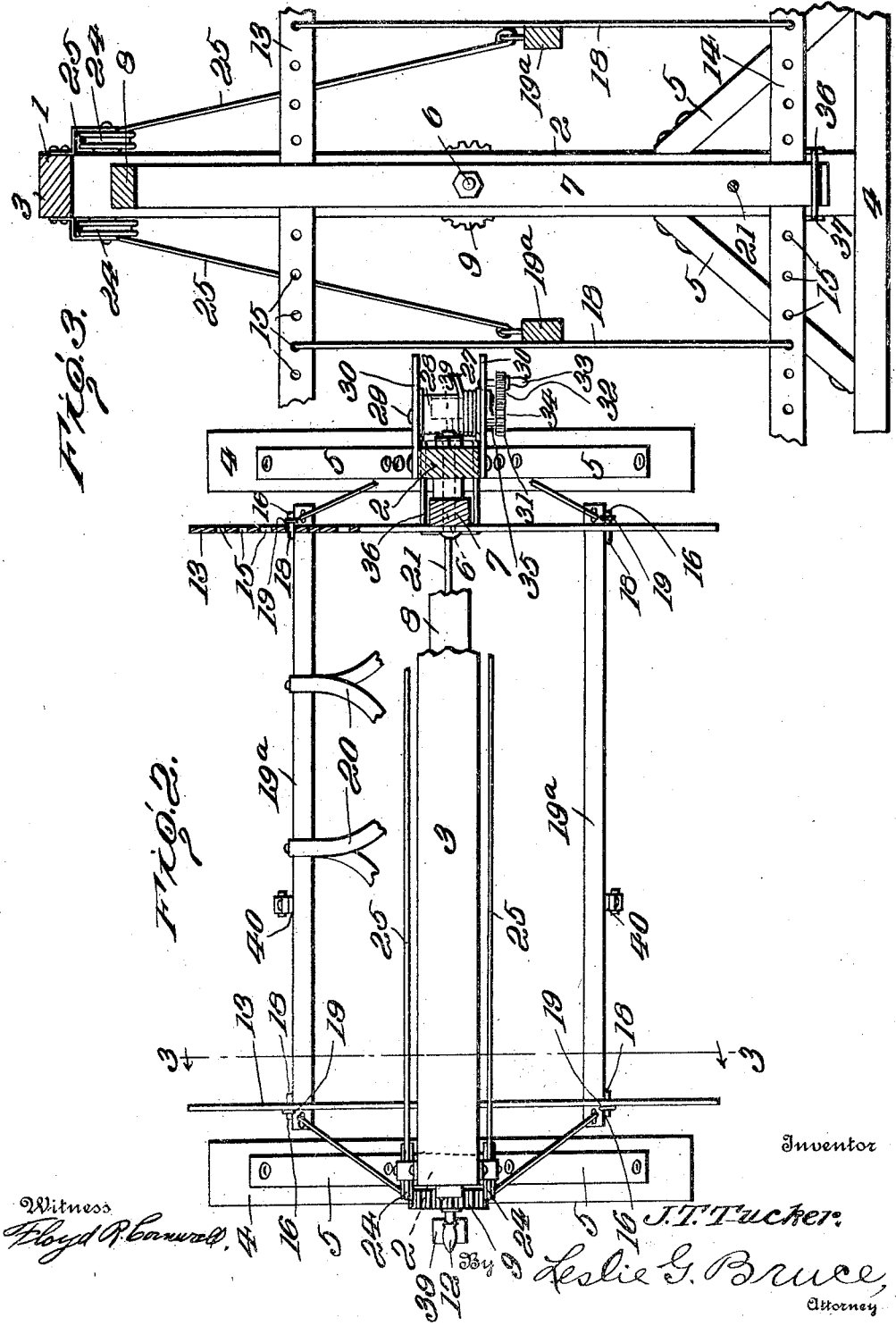

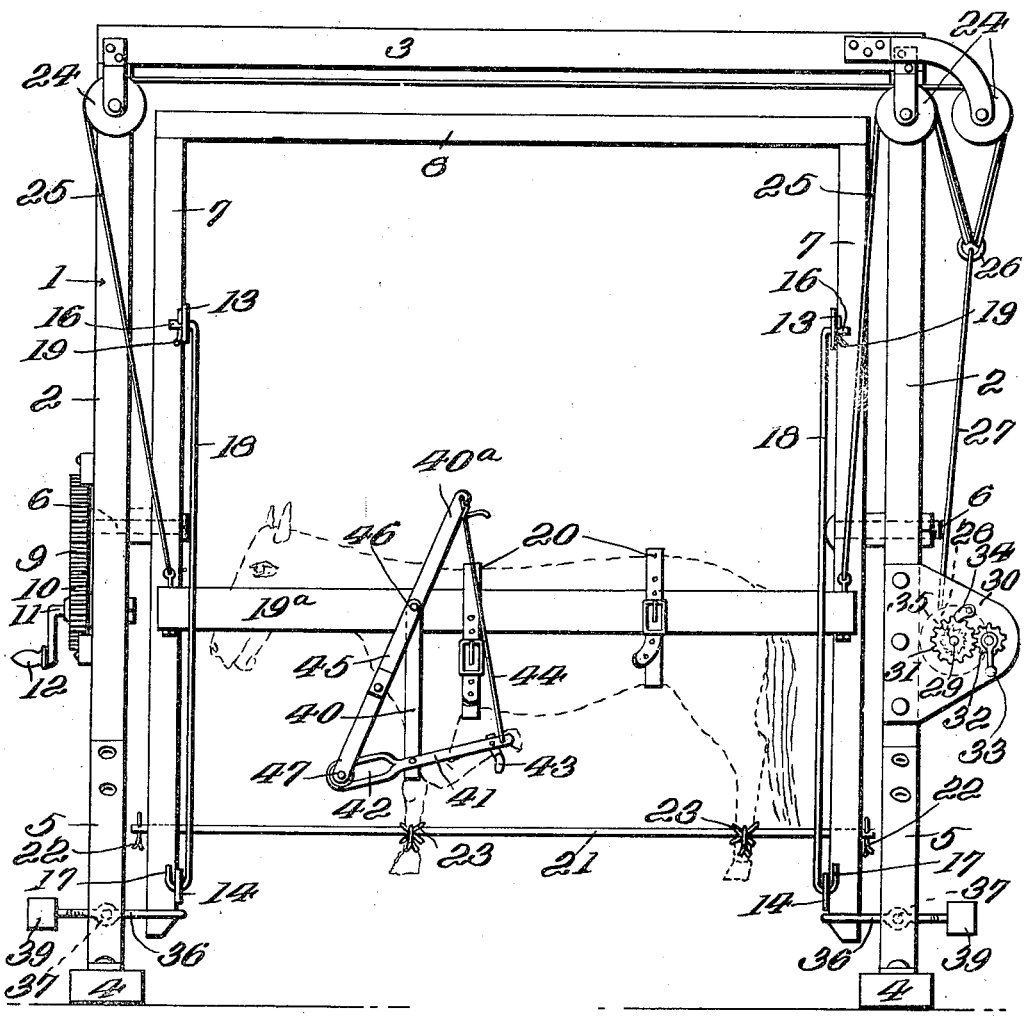

UNITED STATES PATENT OFFICE.

JOSEPH THOMAS TUCKER, OF MATCH, TENNESSEE.

SAFETY STOCK DEVICE.

1,375,189.  Specification of Letters Patent.  Patented Apr. 19, 1921.

Application filed April 25, 1919. Serial No. 292,592.

*To all whom it may concern:*

Be it known that I, JOSEPH T. TUCKER, a citizen of the United States, residing at Match, R. F. D. No. 1, in the county of Maury and State of Tennessee, have invented certain new and useful Improvements in Safety Stock Devices, of which the following is a specification.

This invention relates to improvements in apparatus for securing or supporting animals during the time they are being shod or operated upon.

One of the objects of the invention is to provide an apparatus of the above character, which may readily be adjusted to accommodate animals of various sizes.

Another object is to provide an apparatus in which heavy animals may be easily elevated and swung to suitable positions for operating purposes.

A further object of the invention is to furnish an apparatus of the above type with means for securing an animal's feet and for holding the hoof in raised position during shoeing.

With the foregoing objects outlined and with other objects in view, the invention consists in the novel features hereinafter described in detail, illustrated in the accompanying drawings, and more particularly pointed out in the appended claims.

Referring to the drawings:—

Figure 1 is a side view of the improved apparatus showing a horse supported by the same.

Fig. 2 is a top plan view, partly broken away.

Fig. 3 is a transverse vertical sectional view of the same.

In the drawings, 1 designates a stationary frame consisting of vertical posts 2, connected together at their upper ends by a cross beam 3, and provided at their lower ends with horizontal bases 4. The posts are braced by stays 5. The bases and stays are employed in the preferable construction of the frame 1, but it is obvious that the posts 2 may be held by other means.

The posts 2 are provided with horizontal axles 6, on which are journaled the side bars 7 of a vertically rotatable frame 8. One of the axles is fixed to said frame 8 and is provided with a fixed gear 9, meshing with an operating gear 10, which is fixed to a shaft 11, journaled in one of the side posts 2 of the stationary frame 1. The shaft 11 has an operating handle 12, which is turned for the purpose of swinging the frame 8 and a pawl engages the gear 10 for locking the gear in various positions.

The side bars of the rotatable frame are provided with upper and lower cross arms 13 and 14, which are provided with spaced apertures 15 adapted to receive the bent ends 16 and 17 of the vertical adjusting rods 18. The upper ends 16 of the rods are provided with suitable fastening means, such as cotter pins 19 for the purpose of detachably securing the upper ends of the rods to the cross arms 13.

From Fig. 3, it will be seen that the rods 18 form guides for the vertically movable beams 19ª, one of which is adapted to be placed on each side of the animal to be supported. These beams are connected to bands or straps 20, which are adapted to be passed around the body of the animal for the purpose of raising the animal when the beams are elevated.

A removable horizontal rod 21 has its ends secured to the lower portions of the side bars 7 of the movable frame and suitable fastening means, such as cotter pins 22, are employed for securing the ends of the rod 21 to said side bars 7. In use, the animal's legs are adapted to be fastened to the rod 21 by suitable straps or cords 23.

The frame 1 is provided with a series of pulleys 24 over which pass ropes or cables 25. Each of these ropes or cables has one of its ends secured to one end of one of the side beams 19 and its other end attached to a ring 26. The ring 26 is connected to a rope 27 which winds upon a drum 28. This drum is mounted on an axle 29 journaled in brackets 30 carried by one of the side posts 2, and the drum is rotated by means of the gears 31, 32, the latter of which is driven by a handle 33. A pawl and ratchet 34, 35 is employed for locking the drum 28 in adjusted positions.

In order to prevent the frame 8 from turning at undesirable moments, the lower portions of the posts 2 are provided with vertically swinging yoke-shaped levers 36, journaled on axles 37 and adapted to engage the lower ends of the side bars 8. Weights 39 are provided on the outer ends of the levers for holding the same in engagement with the bars 8.

For the purpose of securing the animal's leg in position for nailing on or clenching off shoes, each of the side beams 19ª is provided with a vertically extending fixed bar 40 carrying at its lower end a pivoted lever 41 and provided at its upper end with a fixed extension 40ª. This lever is provided at one end with an elongated slot 42 and at its other end with a strap 43 and rope 44. A toggle joint 45 is pivoted at 46 to one of the side beams 19 and it is provided at its lower end with a roller 47, which is movably mounted in the slot 42. The rope 44 is adapted to be secured to the upper end of the extension 40ª.

In operation, assuming that the rod 21 and one of the side beams 19ª is removed from the apparatus, the animal is led into a position in which its head faces one of the posts 2 and its tail is adjacent to the other post 2. Then the beams 19ª are secured to the sides of the animal by means of the straps 20 and the rods 18 are adjusted in order to bring the same in contact with the beams 19ª. Then the handle 33 is turned until the animal is raised to the position shown in Fig. 1, at which time the rod 21 is inserted, and the animal's legs are secured to this rod by means of the cords or straps 23.

During the time that the animal is being elevated, the levers 36 prevent rotation of the frame 8, but when it is desired to revolve the frame 8, the weights 39 are raised and this causes the levers to disengage the lower ends of the side bars 17. The frame 8 may then be revolved or turned by means of the handle 12 through the medium of the gears 9 and 10. It will be seen that the animal may be swung over on its side or it may be placed on its back, and these positions will facilitate operations.

When the apparatus is used for shoeing, the animal's leg is connected by means of the strap 43, to the lever 41. At this time the toggle joint 45 is in folded position to permit the lever 41 to occupy a substantially vertical position. After the leg is secured to the strap, the lever 45 is moved to the position shown in Fig. 1 and the rope 44 is used for securing one end of the lever 41 to the extension 40ª of the bar 40. When the animal's leg is moved to the position shown in Fig. 1, it will be seen that said leg cannot be moved, and consequently a vicious animal may be shod with safety.

While I have described and illustrated the preferable form of my invention, I am aware that various changes may be made in said construction without departing from the spirit of the invention as set forth by the following claims.

What I claim and desire to secure by Letters Patent is:—

1. An apparatus of the kind described, including a frame having a plurality of side bars, a plurality of cross-arms carried by each of said bars and extending transversely of said frame, each of said cross-arms being provided with a series of spaced apertures, vertical guide bars having bent ends passing through said apertures and detachably secured to said cross-arms, a plurality of beams adapted to be secured to the sides of an animal and vertically guided by said rods, and means for raising said beams.

2. An apparatus of the kind described, including a frame rotatable in a vertical plane and provided with vertical guiding means, a plurality of beams adapted to be secured to the sides of an animal and vertically guided by said guiding means, means for raising said beams, a substantially vertical bar fixed to one of the beams, a lever pivoted to said bar and adapted to be secured to an animal's leg, said lever being provided with an elongated slot, a toggle joint pivotally secured to said beam and provided with a roller which engages said slot, and a flexible connection between said lever and said bar.

In testimony whereof I affix my signature.

JOSEPH THOMAS TUCKER.